Aug. 27, 1957 C. DOBELL 2,803,868
METHOD OF CONTINUOUS PRESTRESSING OF ARTICLES
Filed Sept. 14, 1954 3 Sheets-Sheet 1
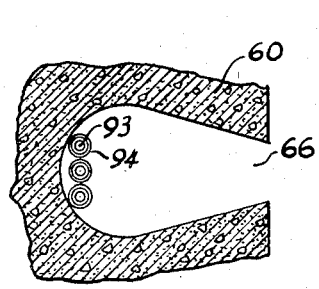
FIG. 18
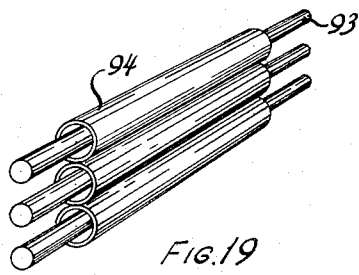
FIG. 19
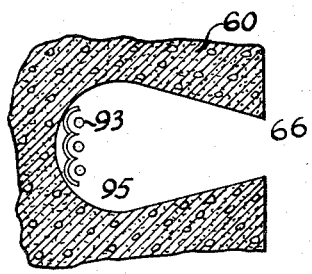
FIG. 20
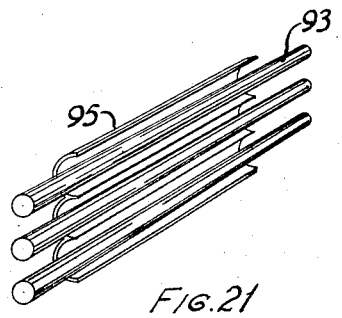
FIG. 21
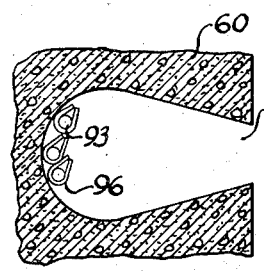
FIG. 22
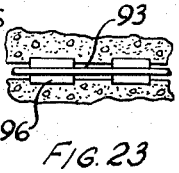
FIG. 23
FIG. 26   FIG. 25   FIG. 24
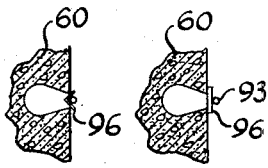
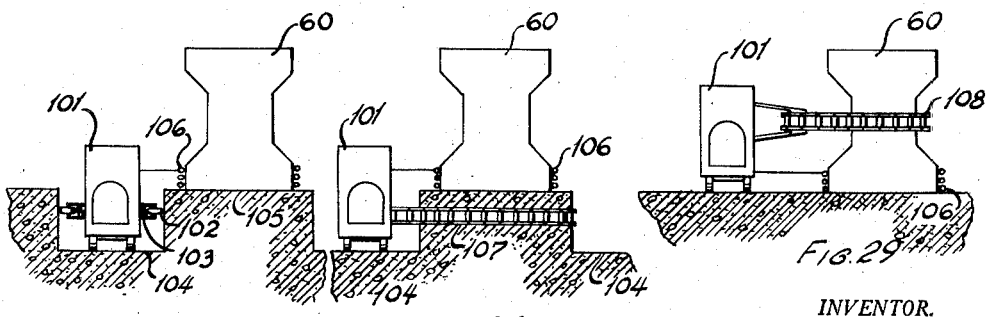
FIG. 27   FIG. 28   FIG. 29
INVENTOR.
CURZON DOBELL
BY William J. Fox,
attorney Aug. 27, 1957  C. DOBELL  2,803,868
METHOD OF CONTINUOUS PRESTRESSING OF ARTICLES
Filed Sept. 14, 1954  3 Sheets-Sheet 2
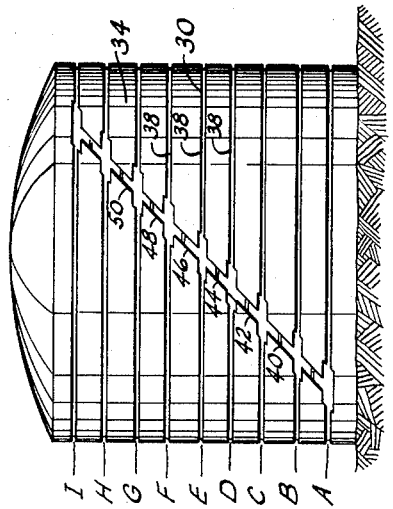
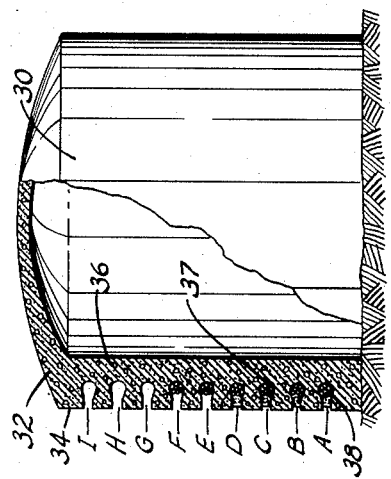
INVENTOR.
Curzon Dobell
BY William J Fox,
attorney Aug. 27, 1957 C. DOBELL 2,803,868
METHOD OF CONTINUOUS PRESTRESSING OF ARTICLES
Filed Sept. 14, 1954 3 Sheets-Sheet 3
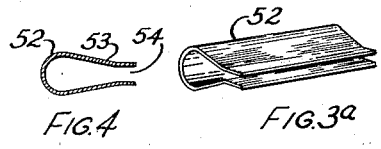
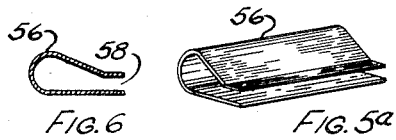
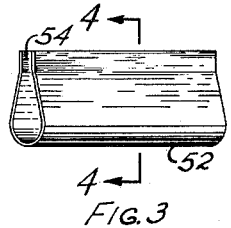
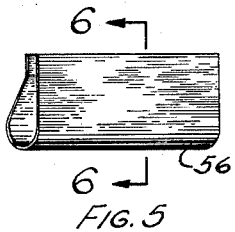
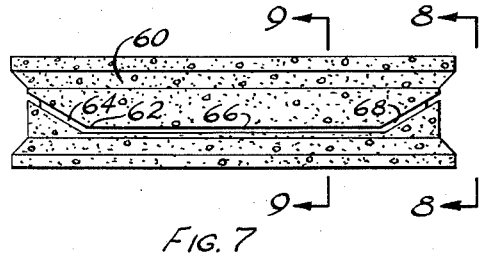
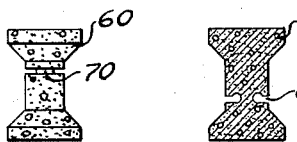
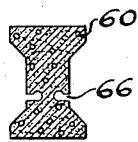
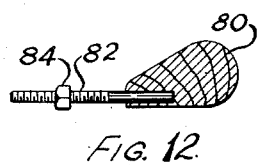
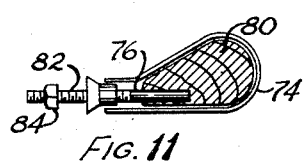
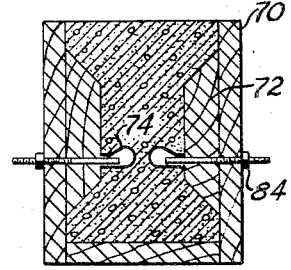
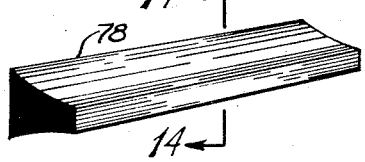
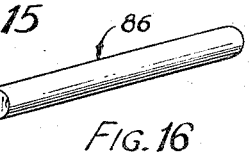
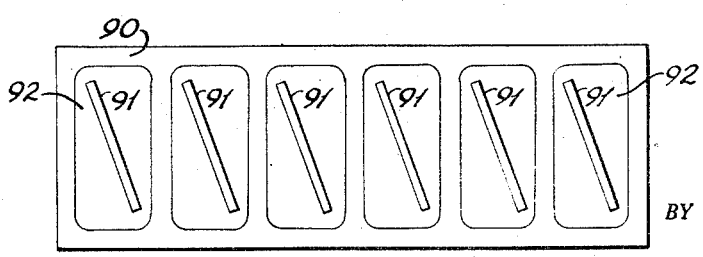
INVENTOR.
Curzon Dobell
BY William J Fox,
attorney United States Patent Office 2,803,868
Patented Aug. 27, 1957

2,803,868
METHOD OF CONTINUOUS PRESTRESSING OF ARTICLES

Curzon Dobell, New York, N. Y., assignor to The Preload Company, Inc., New York, N. Y., a corporation of Delaware Application September 14, 1954, Serial No. 455,888

10 Claims. (Cl. 25—154)

This invention relates to methods for prestressing structures of concrete and other materials such as tanks, girders, slabs, etc., and in particular relates to a method of winding a tensioned tendon about such structures in such a way as to eliminate the need for applying a protective covering to the strands and also to simplify the problem of anchoring such tendons.

The two principal techniques used for prestressing objects today, particularly used for concrete objects, is either to apply a tensioned tendon, usually steel wire to the outside surface of the object, and covering the wire in the case of concrete objects with mortar to protect the wire from corrosion or provide closed conduits in the object and thread the prestressing tendons through the conduits tensioning the tendons with many anchorages needed at the ends of linear structures and at frequent pilasters in circular structures.

In the first case the application of the mortar is an expensive operation and time consuming, especially if several layers of wire are used, with delays for permitting the mortar to set between layers. This protective coating not being prestressed is subject to shrinkage cracking which may permit moisture to enter and corrode the tendon.

It is then an object of this invention to overcome difficulties inherent in the above techniques by providing a housing inserted in the object with a mouth on the outer face of the object adapted to accommodate tendons under tension. It is a further object to reduce to a minimum the surface area of non-prestressed concrete in a concrete object such as the aforementioned mortar covering. It is a further object to provide a simple and inexpensive guide means for directing the course of the wire during a prestressing operation. These and further objects will be developed as this specification proceeds.

This invention can best be understood from reference to the accompanying drawings in which:

Figure 1 is a partial sectional elevation of a circular tank with the tendon housings in place.

Figure 2 is an elevation of a circular tank showing the connection of tendon housings at different levels.

Figures 3 and 3a show a preferred modification of the tendon housing.

Figure 4 is an end view of the tendon housing shown in Figure 3.

Figures 5 and 5a show a further modification of the tendon housing.

Figure 6 is an end view of the tendon housing shown in Figure 5.

Figure 7 is a schematic elevation of an elongated concrete beam showing the mouth of the tendon housing opening onto the surface of the beam.

Figure 8 is an end view of the beam shown in Figure 7.

Figure 9 is a section through 9—9 of Figure 7.

Figure 10 is a sectional elevation through a wooden form to be used for molding concrete beams and showing the tendon housing in position before the pouring of the concrete.

Figure 11 is a sectional elevation of the wire guide with all the necessary elements that are used in sealing off and supporting the tendon housing in the forms.

Figure 12 is a sectional elevation of the bolt used to retain the tendon housing in the forms.

Figure 13 is a sectional elevation of the sealing strip used in connection with the tendon housing to prevent concrete from filling the housing during molding.

Figure 14 is a section through line 14—14 of Figure 13.

Figure 15 is a sectional elevation corresponding to Figure 6 but showing additionally the sealing strip used during grouting.

Figure 16 is an elongated showing of the rubber sealing strip.

Figure 17 is a schematic showing of a preferred track of a vehicle winding beams pursuant to this invention.

Figure 18 is a sectional elevation of a beam showing one type of divider for keeping the wires apart.

Figure 19 shows a portion of the wire with the divider in place.

Figures 20 and 21 show another embodiment of wire divider.

Figure 22 is a sectional elevation of a beam showing a wire divider formed from flat sheet metal.

Figures 23, 24, 25 and 26 show the stepwise placing of the wire divider.

Figure 27 is an elevation showing a beam being wrapped with a machine in a trough.

Figure 28 shows an alternative embodiment with a machine in a trough.

Figure 29 shows an alternative embodiment with a machine on the same level as the beam.

More particularly in the drawings, in Figure 1 the concrete tank 30 has side walls 32 with outer face 34 and inner face 36. Mounted in the outer face of the tank is a plurality of wire receiving receptacles 38 which extend around the entire periphery of the tank and which are spaced apart vertically. The receptacles may be grouped closer together near the bottom of the tank where it is necessary to concentrate the prestressing forces and may be spaced apart near the top of the tank. Alternatively, the amount of wire in the lower units may be greater than in the top units to accomplish the same purpose. The receptacles are designated A through J for ease of reference.

In prestressing a tank such as shown in Figure 1 with the receptacles of this invention, a wire under tension is first anchored in one of the lowermost receptacles; for example in receptacle A, a wire delivering and tensioning a machine such as is well-known in the art then encircles the tank delivering wire 37 under tension into receptacle A. After the requisite number of wires have been placed in receptacle A, the machine continues, without anchoring or otherwise securing the wire, to place the wire in channel 40 (Figure 2) which is an intermediary conduit used for facilitating the transfer of wire vertically to another horizontal receptacle. The preferred procedure would be for the wire to be placed next in channel C and thence in alternate channels until the top of the tank is reached. The machine could then return to the bottom of the tank and then fill the intervening channels. After the wire 37 has been placed in all the channels in the amount needed to accomplish the desired degree of prestressing, the channels can be filled with grout in a manner which will be described later in this specification. By the technique which has just been described, there is thus provided a very inexpensive and easily controlled method of prestressing a concrete tank with a minimum of anchorages, with a minimum of complexity in the wire stressing and placing machine and with no substantial surface uncompressed concrete protective covering needed.

Figures 3 through 6 show in more detail the wire guiding and receiving receptacle with the receptacle shown in Figures 3 and 4 being the preferred embodiment. The receptacle comprised circular section 52 and straight section 53 terminating in a narrow mouth 54. In Figure 5 the circular section 56 is terminating in mouth 58. The entire unit is constructed preferably of light gauge metal similar to that used in eaves troughs for catching rain water from a building. The exact material of construction and in fact the exact shape is not normally critical but may be adapted to suit the particular needs of a particular usage. The mouth 54 should be just slightly wider than the tendon (such as wire) that it is intended to accommodate. For example, when using a wire with a diameter of 0.162 inch, it has been found preferable to use a mouth opening of 0.170. With a wire of a diameter of 0.200, the mouth opening should preferably be approximately 0.250 inch.

Figures 7, 8 and 9 show a concrete beam utilizing the wire receiving receptacle of this invention. Concrete beam 60 has placed in it receptacle 62 bent in a particular shape to overcome the stresses necessary to be compensated by the prestressing of the beam. In this case, the receptacle will have a short downwardly extending section 64, a horizontally extending section 66, and a short upwardly extending section 68 which extends around the short dimension of the beam as receptacle 70. The sections of the receptacle can be joined in any convenient manner, the simplest being merely to telescope one inside the other, a sufficient distance to prevent concrete milk from seeping into the receptacle. The receptacle is placed a sufficient distance in from the surface of the article so that when it is subsequently grouted none of its metal will be exposed. The corrosion of the receptacle would not be critical but could perhaps result in an unsightly appearance by staining the sides of the concrete object.

One method of completely avoiding the corrosion problem is to use a removable receptacle device such as an inflated rubber tube with a shape or held in such a shape by supports that there was provided a mouth opening onto the surface of the article which holds the unit. The rubber unit could be removed by collapsing it. For this purpose, a receptacle is in effect a chamber with a mouth opening onto a surface.

In Figure 10 there is shown a section through a wooden form 70 used for molding concrete beams such as is shown in Figure 7. The form contains pans 72 which give the prerequisite shape to the concrete beam. The wire receiving receptacles 74 are bolted through the form in a sealed condition after which the concerete is poured. To retain the receptacle 74 in the form and at the same time to seal it from the concrete a mechanism is used as shown in Figure 11. There is inserted in the receptacle 74 a series of strips 78 preferably of rubber with a cross-section as shown in Figure 14. At intervals there is inserted bolt 80 which passes through the form 70 and is anchored on the external portion of the form by threads 82 and nut 84. The bolt 80 should preferably have a shape roughly corresponding to the internal shape of the receptacle. This will help in preventing collapse when the concrete is poured. To remove the bolt it is simply turned on its side and slid out through the mouth of the unit. The rubber insert 78 is shaped with a wide divergent section in order to give this shape to the opening in the surface of the concrete object, and at the same time to serve as a spacer to set back from the surface the receptacle 74.

After the receptacle has been filled with its supply of wire, there is then inserted in the mouth of the receptacle a sealing strip 86 preferably of rubber which should fit snugly. Grout is then forced in under slight pressure at about 10–40 pounds per square inch to fill the receptacle. If the rubber strip is large enough, the grout should entirely cover the mouth of the receptacle so as to protect it from corrosion.

To keep the wires spaced apart for good contact with the grout it is suggested that they be wrapped at intervals with a spacing element which can be inserted just as the wire is about to go into the receptacle. Alternatively, small strips of flat sheet metal may be held over the mouth and forced into the receptacle by the passage of the wire to form a spacer.

Figures 18 through 24 show several methods of keeping the wires apart. In Figures 18 and 19 the wire 93 is wrapped with metal sleeve 94 which is snapped on the wire. Figures 20 and 21 show the wire 93 spaced by the use of special divider 95. Figures 22 through 26 show the use of a simple sheet metal divider 96 around the wire 93. In Figure 24, the sheet metal 96 is placed over the opening in the beam. The wire 93 begins to force it in place in Figure 25. In Figure 26, the wire is completely in place and the sheet metal 96 has bent around it.

The surface of the prestressed object will thus contain all prestressed concrete except for the very thin ribbon of grout showing at the surface of the receptacle mouth.

It is contemplated that this invention will be useful not only for prestressing concrete objects but also any other such objects such as metal beams, plastic objects, etc. The prestressing tendons may be of any suitable material capable of withstanding the desired tension such as high-tensile steel, glass fibres, etc.

In the winding of a typical beam, for example, one might use a 30 foot beam, which would be two feet in height. The horizontal section 66 of Figure 7 occupies one-half the length and the sections 64 and 68 occupy one-quarter of the length each. The section 66 is placed so that the mouth opening is three inches from the bottom of the beam. The uprising sections 64 or 68 may preferably be in three divergent sections each spaced six inches apart with the middle one in the middle of the two foot vertical height of the beam. The number of wires used is dependent on the end use of the beam and the economics of wire diameter versus length of wire. A typical wire is one having an ultimate strength of 220,000 pounds per square inch (p. s. i.) and is put on the beam at 120,000 p. s. i.

The use of this invention has greatly simplified the general problems in prestress winding of concrete beams because with this invention there is in effect provided an extremely simple and accurate wire guide, so that all that really need now be supplied is the means for tensioning the wire and moving it around the beam. A truck, jeep or tractor, with a die mounted thereon through which the wire pays out is quite adequate. In using such an arrangement it has been found that a far more economical use of space can be made by placing the beams diagonally on the winding slab 90 as shown in Figure 17. The beams 91 should be placed or cast diagonally on the slab 90 as shown. The path 92 of the tractor or jeep, etc. is painted on the slab as a guide. By this path the tractor makes a wide sweep near the narrow end of the beam and thus prevents the wire from becoming slack. The extra wire is made up by the time the tractor reaches the other end of the beam, but it must now swing wide again, thus resulting in track 92 as shown.

As an alternative procedure, there may be provided troughs in the winding slab and wire winding machines as known in the art may be used to wind the beams, with the troughs acting as guides. The beams rest on the peak between each trough. These wire winding machines may be greatly simplified over those now in use as the die post need not be movable, the wire receptacle in combination with saddle guides placed at the reaction points doing the necessary guiding. The wire winding machine may obtain its frictional drive from spring loaded friction wheels bearing on the sides of the troughs, or from a chain placed around the sides of the trough or the beam.

Figure 27 shows the beam winding machine 101 in trough 104 surrounding the beam 60. Wires 106 are being placed. The beam is mounted on slab 105. The machine is positioned in the trough by wheels 102 which are spring loaded at 103.

In Figure 28, the trough 104 is surrounded by chain 107 from which the machine 101 gets its traction. In Figure 29, the chain 28 is wrapped around the beam 60 and the machine obtains its traction from this chain.

I claim:

1. A method of forming a prestressed concrete tank which comprises forming the concrete tank with a plurality of vertically spaced substantially horizontal tendon receiving receptacles inserted therein, the receptacles opening onto the outer surface of the tank over substantially their entire length, connecting the receptacles with similar receptacles extending with a vertical component from the bottom to the top of the tank, securing the tendon at the bottom of the tank, passing the tendon under tension into the lowermost receptacle and continuing to feed the tendon under tension into the receptacle around the tank, passing to a higher but not adjacent receptacle and passing the tendon into it under tension, repeating the procedure until all the receptacles have had tendons inserted in them, anchoring the end of the tendon so as to retain the tension thereon, closing the mouth of the receptacle with an elongated plug, filling the receptacle with grout under pressure, and removing the elongated plug.

2. The method of producing a prestressed concrete beam that comprises forming the beam with a peripheral prestressing wire receptacle inserted in it and extending around the beam, the receptacle comprising a wire receiving mouth opening along substantially its entire length onto the surface of the beam and of width large enough to pass the wire to be inserted therein and a chamber connected to the mouth for holding a plurality of wires, winding said beam with wire under tension in such a manner that the wires pass through the mouth and into the wire receiving receptacle, securing the ends of the wires so as to retain the tension thereon, closing the mouth of the receptacle with an elongated plug, filling the receptacle with grout under pressure, and removing the elongated plug.

3. The method according to claim 2 in which wire spacing elements are inserted at intervals to space the wires in the wire receiving receptacle.

4. The method according to claim 3, in which the wire spacing element is a piece of sheet metal placed over the mouth and forced into the receptacle by the wire passing over it.

5. The method according to claim 2, in which the winding of the wires is accomplished by a wire-carrying vehicle encircling the beam.

6. The method according to claim 5, in which the vehicle follows a track about the beam which extends away from the beam at the beam ends to retain the tension on the wire.

7. The method according to claim 2 in which the winding of the wire is accomplished by a wire winding machine mounted in a trough below but surrounding the beam.

8. The method according to claim 7 in which the wire winding machine has spring loaded wheels pressing against the sides of the troughs for its driving means.

9. The method according to claim 8 in which the wire winding machine is drawn from a chain surrounding the beam.

10. The method according to claim 8 in which the wire winding machine is driven from a chain surrounding the sides of the trough.

References Cited in the file of this patent

UNITED STATES PATENTS

| 1,781,699 | Parmley | Nov. 18, 1930 |
| 2,579,183 | Freyssinet | Dec. 18, 1951 |

FOREIGN PATENTS

| 951,089 | France | Apr. 11, 1949 |
| 467,321 | Italy | Dec. 3, 1951 |
| 1,011,931 | France | Apr. 7, 1952 |